June 4, 1957  F. D. LOWTHER, JR  2,794,973
TANK GAUGING DEVICE
Filed Nov. 9, 1954  2 Sheets-Sheet 1

INVENTOR.
Franklin D. Lowther, Jr.
BY Victor J. Evans & Co.
ATTORNEYS

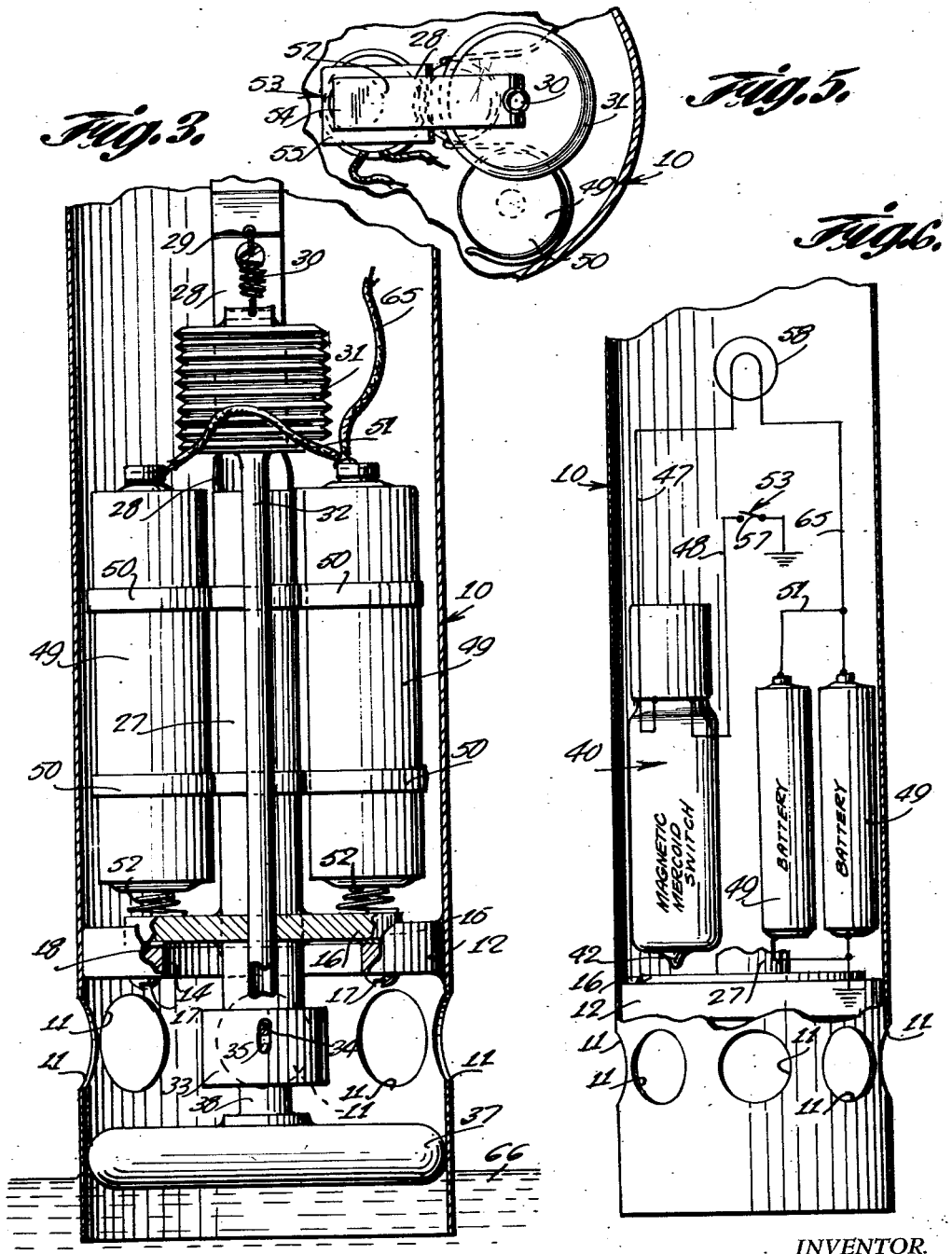

2,794,973
TANK GAUGING DEVICE

Franklin Darwin Lowther, Jr., Orange, Tex.

Application November 9, 1954, Serial No. 467,689

1 Claim. (Cl. 340—244)

This invention relates to a fluid measuring device, and more particularly to a device for gauging the level of liquid or fluid in a tank.

The object of the invention is to provide a device which will permit a person to gauge the level of liquid in a tank with increased accuracy, ease and simplicity.

Another object of the invention is to provide a device which will permit a more accurate gauging of tanks containing liquids, the device including a bulb that is electrically actuated when the liquid level is reached and wherein there is provided a mechanism for eliminating any hazard that may result from spark formation.

A further object of the invention is to provide a tank gauging device which is extremely simple and inexpensive to manufacture.

Other objects and advantages will be apparent during the course of the following description.

In the accompanying drawings, forming a part of this application, and in which like numerals are used to designate like parts throughout the same:

Figure 3 is an elevational view at right angles to the view shown in Figure 2, and with parts broken away and in section.

Figure 5 is a sectional view taken on the line 5—5 of Figure 2.

Figure 6 is a schematic wiring diagram of the electrical system of this invention.

Figure 1:
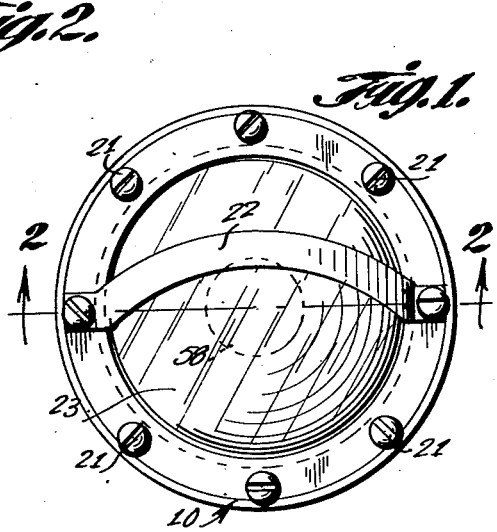
Figure 1 is a top plan view of the tank gauging device, constructed according to the present invention.
Figure 2:
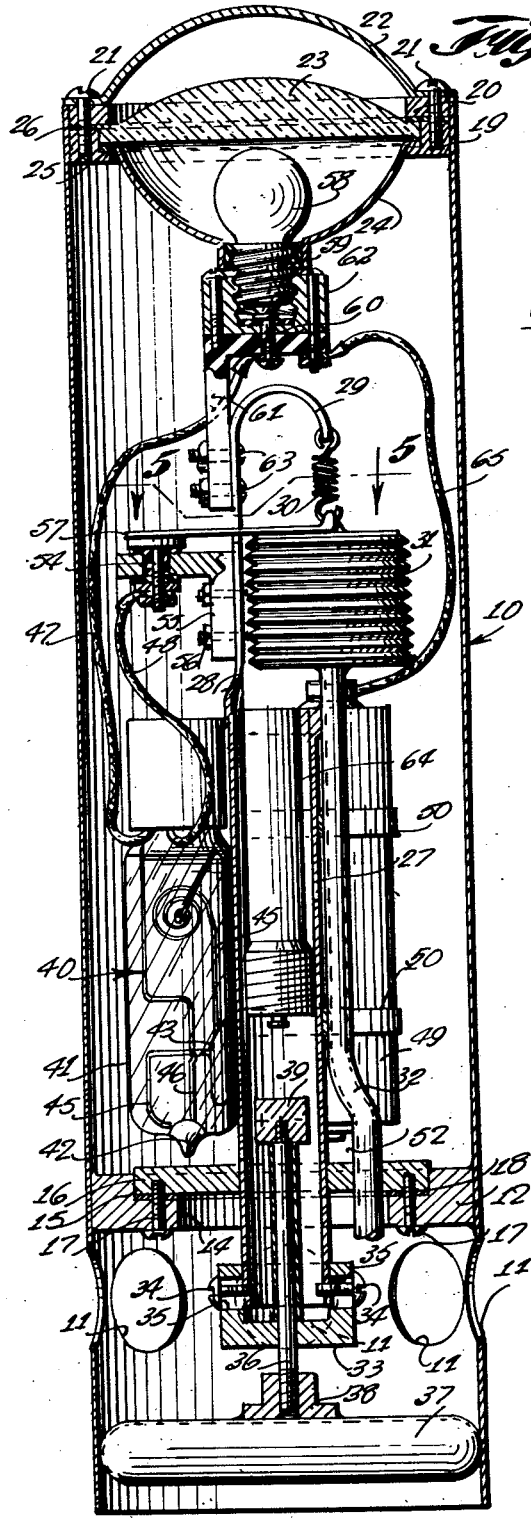
Figure 2 is a sectional view taken on the line 2—2 of Figure 1.

Referring in detail to the drawings, the numeral 10 designates a hollow housing which can be made of any suitable material, and the housing 10 may be cylindrical in shape. The housing 10 is further provided with a plurality of spaced openings 11 in its lower end, Figure 2, and secured within the housing 10 above the openings 11 is a horizontally disposed platform 12. The platform 12 may be secured within the housing 10 in any suitable manner, as for example by welding. The platform 12 is provided with a central opening 14 and there is further provided in the platform or partition 12 a cutout 15 which snugly receives therein a base 16. The platform or partition 12 and the base 16 are detachably connected together by means of the bolts 17. A gasket 18 is interposed between the base 16 and the platform 12 to insure that there will be an air tight connection therebetween.

Figure 4:
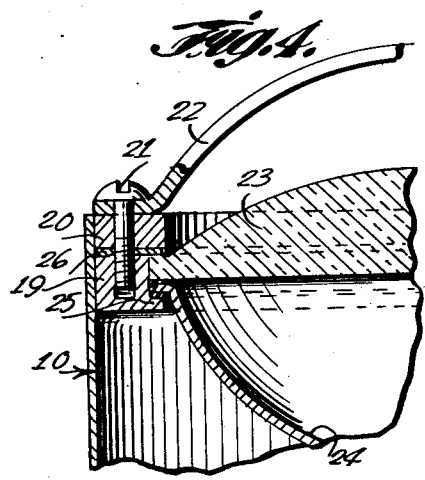
Figure 4 is a fragmentary elevational view with parts broken away and in section showing the top of the device including the lens and reflector.

Arranged within the upper end of the housing 10 and secured therein in any suitable manner, as for example by welding, is a shelf or rim 19. A ring member 20 is detachably connected to the shelf 19 in any suitable manner, as for example by means of the screws or bolts 21, Figure 4. A lens 23 is arranged in the top of the housing, and a hanger 22 may be connected to certain of the bolts 21. The hanger 22 is adapted to be used for lowering the gauging device down into a tank having liquid or fluid. A reflector 24 has its outer peripheral edge received in a suitable cutout in the member 19, and a gasket 25 engages the outer periphery of the reflector 24, there being a gasket 26 between the ring member 20 and the member 19. These gaskets serve to insure that the interior of the housing 10 will be maintained at any pressure to which it is applied or filled, as for example when air is pumped into the interior of the housing as later described in this application.

Arranged within the housing 10 is a hollow tube 27 of copper, brass, or non-magnetic stainless steel which has a support member 28 projecting upwardly therefrom. The support member 28 includes a curved finger 29 on its upper end, and a coil spring 30 has one end connected to the finger 29 while the other end of the spring 30 is connected to a bellows 31. The bellows 31 is adapted to expand and contract depending upon the air pressure within the housing, and a vent pipe or tube 32 depends from the lower end of the bellows 31 and is secured thereto. The lower end of the vent tube 32 terminates below the partition 12.

Adjustably mounted on the lower end of the tube 27 is a cap 33, and the cap 33 is maintained in place by means of a pair of screws 34 which extend through slots 35 in opposite sides of the cap 33, the screws 34 threadedly engaging the lower end of the tube 27. Thus, by loosening the screws 34 the cap 33 can be raised or lowered slightly. A stem 36 slidably projects through the cap 33, and the lower end of the stem 36 is arranged in threaded engagement with a bushing 38 which is secured to a float 37. Thus, when the float 37 is raised or lowered by fluid or liquid in a tank, the stem 36 will be moved up or down. The bushing 38 is adapted to engage the lower surface of the cap 33 so that these two members cooperate to define a limit stop. However, by adjusting the cap 33 by means of the bolts 34, the amount of travel of the float 37 can be varied as desired.

Mounted on the upper end of the stem 36 is a magnet 39. The magnet 39 is adapted to actuate a mercury magnetic switch 40 which is arranged within the housing 10 but outside of the tube 27. The mercury switch 40 includes a casing 41 that may have a globule or mass of mercury 42 in its lower end, Figure 2. A movable contact arm 43 which may be made of a suitable metal, is adapted to be moved as the magnet 39 is raised by the float 37. The contact arm 43 has secured thereto a substantially L-shaped contact piece 45 which is mounted for movement into and out of engagement with the mercury bubble 42. The arm 43 may be mounted on a spring support 44. A conductor or electric wire 46 leads from the bubble 42 to the top of the switch 40, and a pair of wires 47 and 48 lead from the switch 40.

Arranged within the housing 10 is a pair of batteries 49 which may be supported by suitable clips 50. A wire 51 may connect the batteries 49 together, and springs 52 are interposed between the bottoms of the batteries 49 and the base 16, Figure 3. The wire 48 leads to a switch 53 which may include a headed pin 54 that is mounted in a support member 55. The support member 55 may be secured to the bracket or member 28 by suitable bolt and nut assemblies 56. A lever 57 is mounted for movement into and out of engagement with the top of the pin 54, and the lever 57 is secured as by welding to the top of the bellows 31. Thus, when the bellows 31 expands or moves upwardly, the lever 57 will move away from the top of the pin 54 so that the electrical circuit leading to the bulb 58 will be disrupted or interrupted so that there will be no possibility of spark formation in the event a leak occurs. This is highly advantageous when the fluids being gauged are of a flammable nature. The bulb 58 is mounted in a socket 59 which is seated in a body member 62, and a contact pin 60 extends up into engagement with the lower end of the bulb 58 or its socket. The wire 47 is connected to the pin 60. A body member 62 may be supported on a bracket 61 which extends upwardly from the support member 28 and is secured thereto.

The bracket 61 may be secured to the support member 28 by suitable bolt and nut assemblies 63. Positioned in the upper portion of the tube 27 is a valve 64 which may be similar to the valves used on inner tubes of pneumatic tires. By means of the valve 64, air under pressure can be supplied to the interior of the housing 10 above the partition 12. A wire 65 connects the base 62 having the socket 59 therein, to the batteries 49.

From the foregoing it is apparent that there has been provide a tank gauging device which can be used for effectively gauging the level of fluid in a tank. Heretofore gauging of tanks containing liquids in an accurate manner has been a troublesome problem and the most prevalent manner of gauging tanks has been to lower a float into the tank. Then, when the float is felt to be buoyant when reaching the liquid, the distance from the top of the tank to the apparent liquid level is read in inches on a tape line by which the float is lowered into the tank. The problem has been to determine exactly when the float reaches the level of liquid in the tank and the person gauging the tank must depend entirely upon his sense of "feel." Obviously this sense of "feel" differs greatly between gaugers, and also the problem is made more difficult due to the different characteristics or qualities of the buoyancy of the floats being used. With the present invention a person can gauge the level of liquid in a tank to within one-fourth of an inch in any easy manner, and with a high degree of accuracy.

In using the gauge of the present invention, it will be seen that when the gauge reaches the level of the liquid in the tank as shown in Figure 3 wherein the numeral 66 designates the fluid, the float 37 moves upwardly causing the magnet 39 to actuate the normally open circuit magnetic mercury switch 40. When the magnet 39 moves upwardly, the arm 43 will be attracted thereto to thereby move the contact piece 45 into engagement with the mercury 42 so as to complete the circuit through the conductor 46. Thus, the electrical circuit from the cells 49 will be completed to the lamp 58 through the switch 40 and through the contact button 54 and lever 57 to the chassis of the assembly which forms the ground side of the circuit. With the circuit completed, the lamp 58 will light to thereby indicate the fact that the level of liquid has been reached. Then, when the gauger looks down through the gauging opening in the top of the tank, he knows the very instant that the float 37 reaches the liquid so that there is no guesswork and the keen sense of "feel" is not necessary.

The present invention further includes a safety device since many tanks which are gauged contain flammable liquid such as tanks in oil fields, refineries, chemical plants and the like and such tanks having flammable liquids cannot be used with a device which produces a spark. The sparking hazard is eliminated in the following manner. The unit is operated under pressure and is made pressure tight by means of the gaskets 26, 25, and 18. The bellows 31 move downward when the pressure inside the housing 10 is greater than the atmospheric pressure, and it is to be noted that the bellows 31 are vented to the atmosphere through the pipe 32. The gauging device may be pressured at fifteen to twenty pounds per square inch gauge pressure but of course the pressure setting can be varied.

The various parts can be removed as for example when the batteries are to be replaced and then pressure is applied to the unit by inserting a hose which may be attached to a hand aspirator bulb upward through the tube 27 until the air supply engages the valve 64. The float 37 is previously detached and then the desired pressure is introduced into the housing 10 above the partition 12. After the desired pressure has been built up in the unit, the float 37 is again connected in place and then the limit cap 33 is secured in position and the device is ready for use.

Then, it will be seen that the pressure inside the device makes it impossible for any outside gases to enter the housing. In the event that the pressure inside the device decreases, due to faulty gaskets, looseness of the screws, or a leak in the unit, the device would become inoperative since the lever 57 will move out of engagement with the button 54 because the bellows 31 would move upwardly. The breaking point of the contact button and lever 57 may be varied as desired, and for example the breaking point may be ten pounds per square inch gauge and the device may be under fifteen to twenty pounds per square inch gauge pressure. When the pressure inside of the housing decreases to the breaking point such as ten pounds per square inch, the device will become inoperative since the gauging is accomplished by observing the moment of lighting of the lamp 58 then the device would have to be repressured before it could be used again. The housing 10 may be made of a thin non-magnetic material such as copper, brass, or non-magnetic stainless steel. When gauging flammable liquids, brass or copper are preferred. Certain of the internal components may be of conventional construction. The device would be practically negligible insofar as cost of maintenance thereof is concerned. The switch 40 is of the normally open type and the reflector 24 which may be made of metal is electrically insulated from the chassis by means of the gasket 25. It is essential that the tube 27 be of non-magnetic material since it is readily apparent that if the tube were of magnetic material, the magnet 39 would adhere to the inside walls of the tube. As an example of the size of the device, the device may be 6⅜ inches long by 1¾ inches in diameter, but it is to be understood that the parts can be made of any desired shape or size.

I claim:

A device for gauging the level of liquid in a tank, comprising a hollow cylindrical housing provided with a plurality of openings adjacent its lower end, a partition secured within said housing above said openings and provided with a central cutout, a base detachably connected to the upper surface of said partition, a hollow tube extending through said base and secured thereto, a shelf secured within the upper portion of said housing and provided with a central cutout, a lens mounted in said shelf adjacent the top of the housing, a ring member detachably connected to said shelf, a reflector arranged below said lens, a support member arranged within said housing below said reflector, a light bulb projecting into said reflector, a body member extending upwardly from said tube and including a curved finger, an expansible bellows arranged in said housing and adapted to expand and contract depending upon the air pressure within the housing whereby when the bellows expands, the electrical circuit leading to the bulb will be interrupted, a coil spring extending between said bellows and finger and connected thereto, a vent pipe depending from the lower end of said bellows, and connected to the lower end of said bellows, a float mounted in the lower end of said housing, a stop cap adjustably mounted on the lower end of said tube, a valve positioned in the upper end of said tube, a stem connected to said float and slidably projecting through said cap, a magnet mounted on the upper end of said stem, batteries positioned in said housing and electrically connected to said bulb, a magnetic mercury switch arranged in said housing and operated by said magnet and electrically connected to said batteries and bulb whereby when the gauging device reaches the level of the liquid in the tank, the float moves upwardly causing the magnet to actuate the normally open circuit magnetic mercury switch, and when the magnet moves upwardly, the electrical circuit from the batteries will be completed to the bulb so that with the circuit completed, the bulb will light to thereby indicate the fact that the level of liquid has been reached.

References Cited in the file of this patent

UNITED STATES PATENTS

| 1,481,471 | La Londe | Jan. 22, 1924 |
| 2,440,987 | Thompson | May 4, 1948 |
| 2,671,834 | Kmiecik | Mar. 9, 1954 |

FOREIGN PATENTS

| 699,840 | Great Britain | Nov. 18, 1953 |